Oct. 7, 1924.

1,510,968

H. A. WADELL ET AL

MACHINE AND PROCESS FOR OPENING NUT SHELLS

Filed April 10, 1923    3 Sheets-Sheet 1

Inventors
Hakon A. Wadell
and Sven Axel Stålberg
By
Attorney

Oct. 7, 1924.  
H. A. WADELL ET AL  
1,510,968  
MACHINE AND PROCESS FOR OPENING NUT SHELLS  
Filed April 10, 1923   3 Sheets-Sheet 2
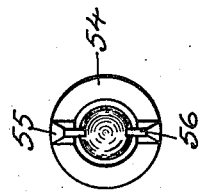
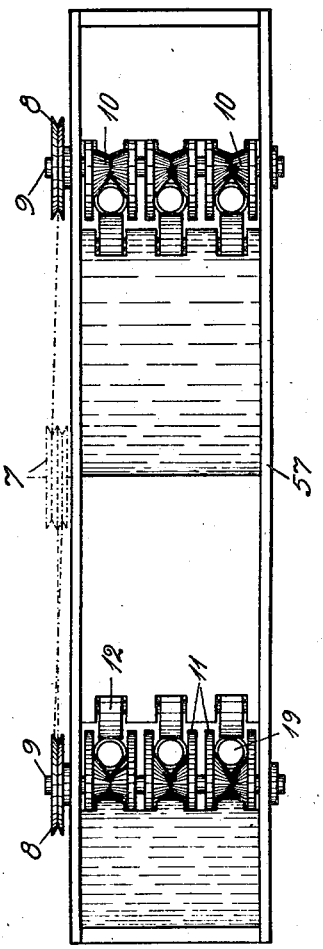
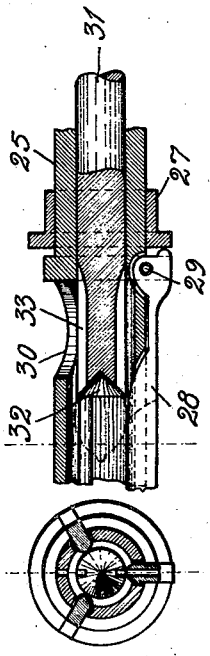
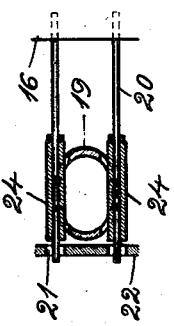
Inventors:  
Hakon A. Wadell  
and Sven Axel Stålberg  
By  
Attorney

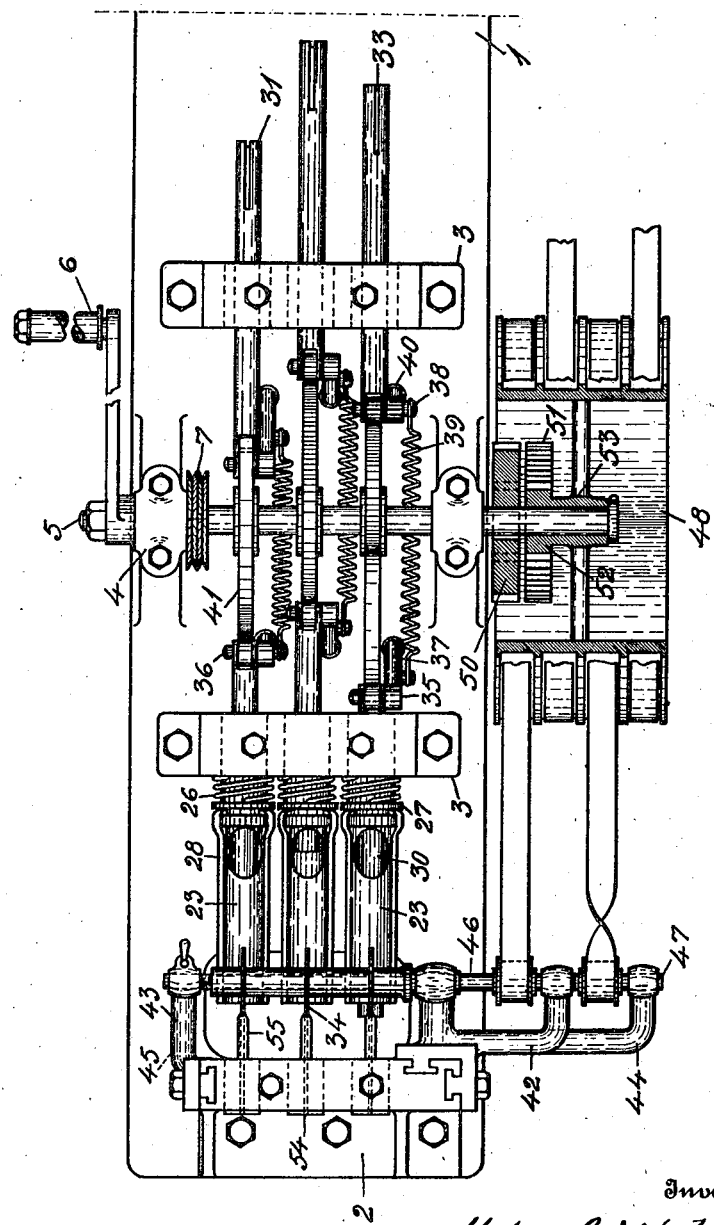

Patented Oct. 7, 1924.

1,510,968

UNITED STATES PATENT OFFICE.

HAKON A. WADELL AND SVEN AXEL STÅLBERG, OF MEXICO, MEXICO.

MACHINE AND PROCESS FOR OPENING NUT SHELLS.

Application filed April 10, 1923. Serial No. 631,119½.

*To all whom it may concern:*

Be it known that we, HAKON A. WADELL and SVEN AXEL STÅLBERG, subjects of the King of Sweden, residents of Mexico city, Federal District, Mexico, have invented certain new and useful Improvements in Machines and Processes for Opening Nut Shells, of which the following is a specification.

This invention refers to a machine for cutting and stripping nut shells, especially designed for opening the shells of palm-nuts such as those called "coquitos" in Spanish America. The hard shell of the coquito nut is longitudinally sawn into from both sides and then pushed up against two oppositely disposed wedges fastened on a tubular head which is provided with interiorly disposed, opposite rails along which the kernel or meat of the nut is slid and finally discharged through said tubular head, separately from two split halves of the shell.

Up to now, several machines have been invented for separating the kernels of such nuts, but all are based upon the principle of cracking the nut, the shell of which is extremely hard and not easily breakable. Hence when cracked, the broken fragments of the shell are forced into the kernel which is not easily separated from the shell.

With our invention, the two halves of the shell fall by their own weight towards each side, while the massive kernel advances through the tubular head, entirely free from any particle of the shell.

Our invention furthermore has for an object to provide a new feeding device or mechanism by which the small cocoanuts are inserted endwise into a feeding channel which will place them in a resting horizontal position from which they are snapped one by one into a tubular centering device which ejects them endwise towards two disc-saws. Nuts of any size whatever are held in proper position and at the proper distance from the two oppositely revolving saws.

In the drawing:

Fig. 2 is a top view of the feeding mechanism.

Fig. 3 is a top view of the machine with the feeding mechanism removed and certain parts in horizontal section.

Fig. 4 is a part-sectional end view of the centering device.

Fig. 5 is a longitudinal section of the centering device and the plunger.

Fig. 6 is an end view of the shell opener with the guiding rails for the kernel.

Fig. 7 is a horizontal section of the yielding gripping device.

Figure 1:
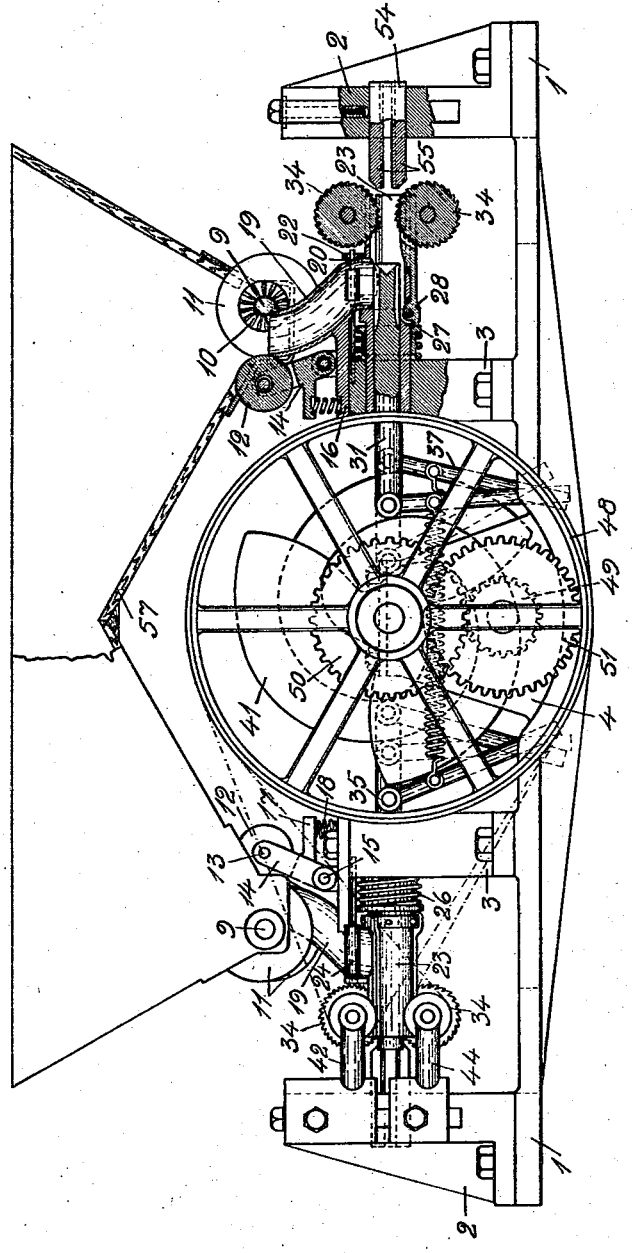
Fig. 1 is an elevation, partially in vertical section, of our machine.

Our machine comprises a portable frame work formed by the base plate 1 upon which are fastened the end standards 2, the intermediate standards 3 and two central standards 4 for the main shaft 5, the movement of which is transmitted to all the parts of the machine, said shaft carrying an operating handle 6.

On the shaft 5 is also fastened a double channelled pulley 7 which transmits movement to the pulleys 8 fastened on two shorter shafts 9, as indicated in Fig. 2, each of which shafts 9, in the construction shown, carries three grooved feed rollers 10 provided with eccentric flanges 11.

Presser rollers 12 coact with the feed rollers 10 and are mounted on axles 13 journaled in bifurcated arms 14 pivoted at 15 to the cover 16; and between the latter and the heel 17 of each bifurcated arm is inserted a spring 18 which presses the roller 12 against the corresponding tubular feeding chute 19.

The chute 19 is circular in cross-section at its upper end; but towards its lower end, where it joins the cover 16, said chute becomes somewhat oval.

The lower end of each chute 19 is cut away at opposite sides, as shown in Fig. 7; and across the openings thus produced extend two flexible bars 20 fastened at their inner ends in the adjacent intermediate standard 3, the outer ends of said bars resting in horizontal openings 21 formed in a vertical supporting plate 22 which is mounted upon the centering tubes 23.

Elongated rollers 24 are mounted upon the flexible bars 20 forming elastic grippers for the cocoanuts. The tubes 23 are fastened by their reduced extensions 25 to the intermediate standards 3, and springs 26 exert pressure against the sliding sleeves 27 which equalize the pressure upon the pivoted centering levers 28 mouted on pivots 29 fastened to the tubes 23.

All the centering tubes 23 are perforated at 30 so as to leave an entrance for the cocoanuts, which latter are fed to the tubes one by one; and within each tube slides a reciprocating plunger 31 having in one end a conical socket 32 to receive the end of a nut. The plunger furthermore has two oppositely-disposed grooves 33 into which project two circular saws 34.

The plungers 31 carry in their bifurcated inner ends small rollers 35 mounted on pivots 36 to which a set of arms 37 is also pivoted. These arms 37 have projecting pins 38 to which are fastened spiral springs 39 for maintaining the distance between two opposing arms. The lower ends of said arms 37 project through holes 40 in the base plate 1 and are thereby fulcrumed, and when a plunger on the left side of the machine ejects a kernel from the machine, then a plunger on the right side of the machine will be drawn out of its tube preparatory to ejecting a kernel from that side of the machine. Cams 41 are mounted on the main shaft 5 and act upon the rollers 35.

To each end standard 2 are fastened adjustable upper arms 42 and 43, and lower arms 44 and 45; the two upper arms 42 and 43 supporting the small shaft 46 carrying the upper saws, and the two lower arms 44 and 45 supporting the shaft 47 carrying the lower saws.

Upon the shafts 46 and 47 are also fastened the transmission pulleys which are belted to receive movement from a pulley 48 loosely mounted on the drive shaft 5, the latter having keyed to it a pinion 50 forming one element of a speed-increasing train. This pinion 50 meshes with a small pinion 49 having fastened to it a large pinion 51 which, in turn, meshes with and drives a small pinion 52 fast on the hub 53 of pulley 48.

In each end standard 2 is mounted a set of shell-opening devices, one for each tube 23 and in line therewith, each device comprising a tubular head 54 inserted in the standard and provided with wedges 55 which enter the two opposing incisions made in the shell by the saws. Beyond the wedges, and extending through the tubular head, are arranged guide rods or rails 56. When the two halves of the shell have been separated by the wedges 55, then the kernel of the nut will be slid along the rails 56 and discharged through the tubular head 54, dropping outside of the machine.

The supporting arms 42, 43, 44 and 45 are adjustable on the standards so as to compensate for wear on the circular saws 34, and on the top of the machine is mounted a hopper 57 having two compartments, each of which will feed the cocoanuts to the corresponding half of the machine which, as will be understood, has a double action. The parts at each side correspond exactly with those of the other side.

The operation of the machine is as follows:

The nuts are fed endwise from the hopper 57, due to the cooperation between the roll flanges 11 and the presser rollers 12, and slide down the chutes 19 one at a time, finally assuming a horizontal position between the yielding gripping rollers 24 at the bottom of the chutes. By the feeding action pressing down on the nut held by the gripping rollers 24, that nut will be sprung through the opening 30 and engaged by the centering levers 28, which are constantly held in equidistant position with relation to the axial line of the tube 23. Under the action of the cam 41, the plunger 31 will exert pressure on the end of the cocoanut, forcing it outward through said tube and in between the upper and lower circular saws 34 where it is cut. When further advanced, the cocoanut will be split by the upper and lower wedges 55, the kernel being immediately engaged by the guide rails 56, and while both halves of the shell fall by gravity through the machine, the kernel will advance through the tubular head 54 and fall outside of the machine. When a plunger is in such extreme position, the corresponding opposite plunger will have been retracted to a position in which the opening 30 in the corresponding feed tube 23 is unobstructed by the plunger, and a nut will fall thereinto through said opening, repeating the same movements as just described.

As all six plungers shown are not simultaneously brought to the same position of advance or retreat in their reciprocating movements, the load and resistance will be evenly distributed; and during each revolution of the handle 6 three nuts on one side of the machine will be cut and shelled, while during the next revolution of the handle three corresponding actions on the opposite side of the machine will take place.

Our machine, as will be seen from the foregoing description, is portable, due to its reduced weight, but sufficiently rapid in action to insure a great yield, and all the kernels are delivered absolutely intact with the exception of the small incisions made by the saws. Virtually no part of the kernel is lost with the exception of the insignificant portion cut away by the saw teeth.

In case no transportation difficulties have to be taken into consideration, machines may be constructed comprising more than three sets on each side, but in such event the machine could probably not be worked manually and the handle 6 would be substituted by a main driving pulley.

Having now described our invention what we claim is:

1. A machine for opening nut shells, comprising a hopper, grooved feeding rollers at the discharging openings in said hopper, said rollers being provided with eccentric flanges, spring-loaded presser rollers cooperating with said feeding rollers, flexible grippers for snapping the nuts one at a time into centering tubes, centering levers projecting inwardly into said centering tubes, reciprocating plungers therein, oppositely-disposed cutting devices projecting into said centering tubes, wedge-shaped splitters alined with said cutting devices for removing the shells, and guiding members for the kernels.

2. A machine for opening nut shells, comprising a hopper, grooved feeding rollers at the discharging openings in said hopper, said rollers having eccentric flanges, spring-loaded presser rollers cooperating with said feeding rollers, chutes leading to gripping members, centering tubes each with a lateral inlet, yieldingly mounted centering levers projecting into the interior of said centering tubes, reciprocating plungers therein, pairs of adjustable alined cutting devices projecting into said centering tubes, a tubular passage for the kernel of less diameter than that of the shell, guiding members in said passage, wedges facing the cutting lines of said cutting devices, and means for operating said plungers in succession.

3. A machine for shelling nuts, comprising a centering tube having opposed, longitudinal slots in its outer end and a feed opening in its upper portion intermediate its ends, a feed chute discharging into said opening, a pair of yielding gripping rollers at the bottom of the chute for snapping the nuts one at a time through said opening into the tube, shell-cutting devices projecting through said slots, a reciprocatory plunger working in said tube for forcing the nuts endwise therethrough and against the cutting devices, and means for stripping the cut shell from the kernel as a nut passes beyond said cutting devices; substantially as described.

4. In a machine for shelling nuts, the combination of cutting devices for making incisions in the shells of the nuts, means for feeding the nuts one at a time to the cutting devices, a hollow tubular head positioned to receive the nuts as they pass beyond the cutting devices, oppositely-facing wedges disposed in line with the cutting devices and extending toward the same from said head to enter and expand the incisions and strip the split shells from the kernels, and guide rods in said head extending rearwardly beyond the wedges to engage and support the kernels; substantially as described.

5. In a machine for shelling nuts, the combination of a pair of axially-alining centering tubes disposed in spaced relation, means for feeding nuts, one at a time, to each tube, shell-incising means associated with each tube, a pair of reversely-acting plungers working in said tubes to feed the nuts therethrough to the incising means in alternation, operating means for the plungers, and means for expanding the incisions and stripping the split shells from the kernels; substantially as described.

6. A nut-shelling machine, according to claim 5, in which the plungers have a common operating element located in the space between the confronting inner ends of the tubes, and in which a coil spring, also disposed in said space, yieldingly connects the plungers together; substantially as described.

7. In a machine for shelling nuts, the combination of a pair of axially-alining centering tubes disposed in spaced relation, means for feeding nuts, one at a time, to each tube, shell-incising means associated with each tube, a pair of reversely-acting plungers working in said tubes to feed the nuts therethrough to the incising means in alternation, a roller on the inner end of each plunger, a depending arm pivotally related to the said inner end of each plunger and fulcrumed adjacent its lower end in the machine, a coil spring connected at its opposite ends to said arms, a rotary cam disposed in the space between the two centering tubes and adapted to engage the rollers on both plungers to operate the same in alternation, and means for expanding the incisions and stripping the split shells from the kernels; substantially as described.

8. In a nut-shelling machine, the combination of a centering tube having a plurality of longitudinal slits, a set of centering levers movable inwardly through said slits to engage and support a nut, shell-incising means located adjacent the discharge end of the tube, means for feeding the nuts one at a time into said tube into position to be engaged by the centering levers, means for forcing the nuts through the tube while so engaged and into the zone of action of the incising means, and means for expanding the incisions and stripping the split shells from the kernels; substantially as described.

9. In a nut-shelling machine, the combination of a centering tube having a plurality of longitudinal slits, means for feeding nuts one at a time into the interior of the tube, a set of centering levers pivotally mounted at one end in said slits, means for simultaneously exerting pressure on all of the levers to move them inwardly through the slits and cause them to engage and support a nut within the tube, means for forcing the nuts through the tube while so engaged and into the zone of action of the incising means, and means for expanding the incisions and stripping the split shells from the kernels; substantially as described.

10. In a nut-shelling machine, the combination of a centering tube having a plurality of longitudinal slits, means for feeding nuts one at a time into the interior of the tube, a set of centering levers pivotally mounted at one end in said slits, a sleeve slidable along the tube and engaging all of said levers to move them inwardly through the slits simultaneously and cause them to engage and support a nut within the tube, a tube, a spring acting on said sleeve to effect its sliding movement, means for forcing the nuts through the tube while so engaged and into the zone of action of the incising means, and means for expanding the incisions and stripping the split shells from the kernels; substantially as described.

11. A method of shelling nuts, comprising the steps of feeding the nuts one at a time to a centering device, forcing them endwise through said device, forming longitudinal incisions in opposite sides of the shells during the passage of the nuts therethrough, introducing wedges alined with the incisions into the front ends of the latter during the continued endwise movement of the nuts so as to expand the incisions and strip the split shells from the kernels, supporting and guiding the kernels during their further endwise movement after the shells have been stripped therefrom, and finally discharging the kernels; substantially as described.

12. In a machine for shelling nuts, the combination of a centering tube having opposed, longitudinal slots in its outer end and also having a feed opening; a pair of yielding gripping rollers located at said opening for snapping the nuts one at a time therethrough into the tube; means for feeding the nuts to said rollers; shell-cutting devices projecting through the slots in said tube; and a reciprocatory plunger working in said tube for forcing the nuts endwise therethrough and against the cutting devices.

13. In a machine for shelling nuts, the combination of a centering tube having opposed, longitudinal slots in its outer end; shell-cutting devices projecting through said slots; means for forcing the nuts endwise, one at a time, through the tube and against the cutting devices; a hollow, tubular head alining with the centering tube to receive the nuts therefrom as they pass beyond the cutting devices; and oppositely-facing devices mounted in the receiving tube in line with said cutting devices to expand the cuts made by the latter and strip the shells from the kernels.

In testimony whereof we have affixed our signatures.

HAKON A. WADELL.
SVEN AXEL STÅLBERG.